O. F. SCOTT.
STALK CHOPPER.
APPLICATION FILED MAR. 16, 1912.
1,039,327.
Patented Sept. 24, 1912.
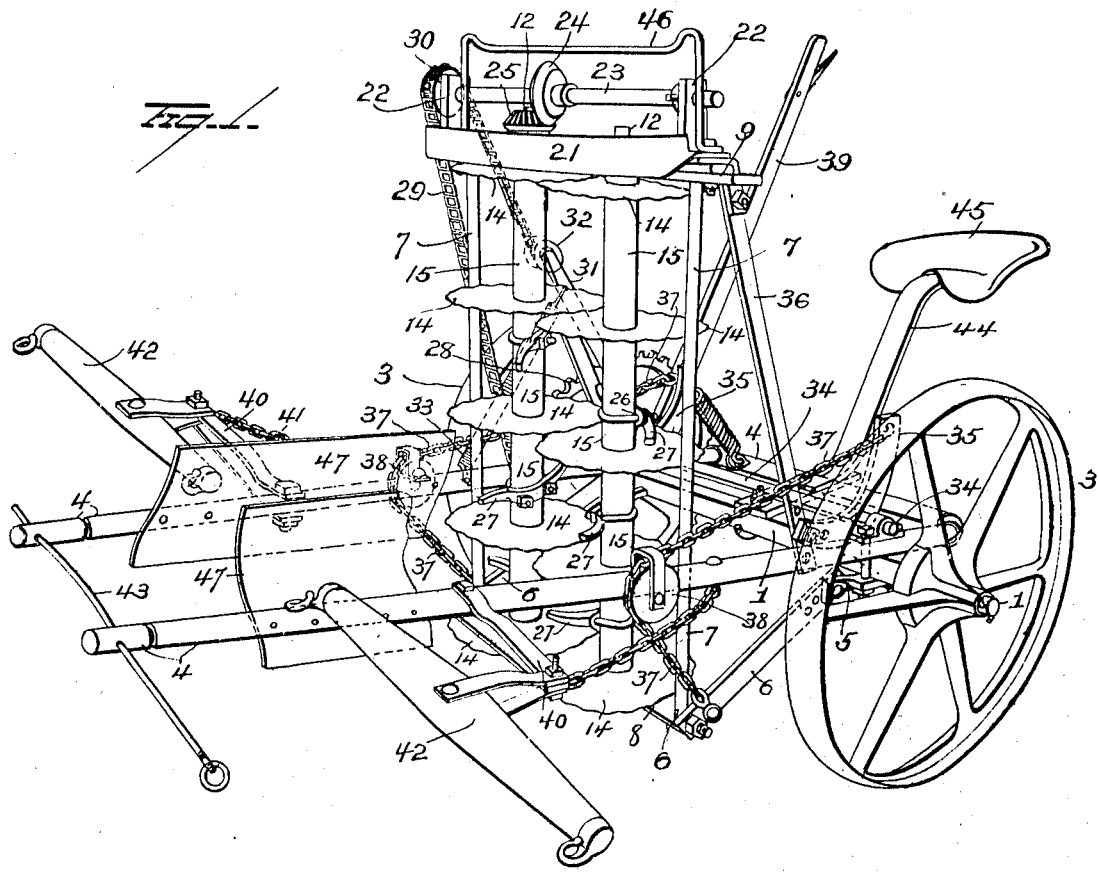
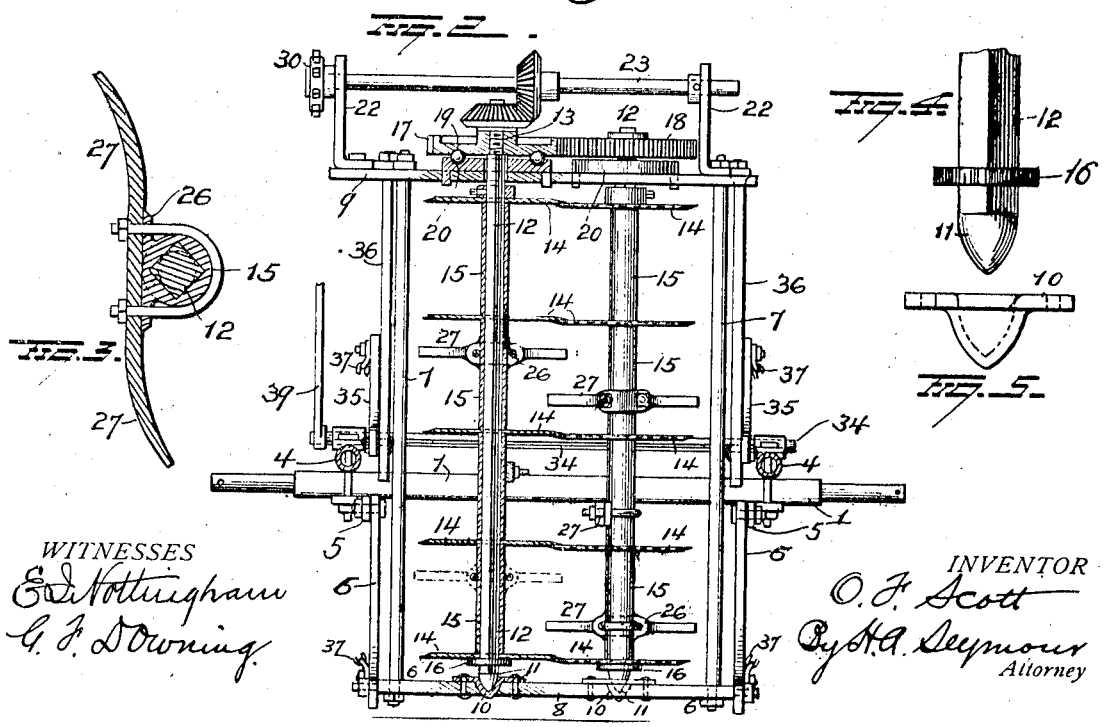
WITNESSES
INVENTOR
O. F. Scott
By H. A. Seymour
Attorney

UNITED STATES PATENT OFFICE.

OSCAR FRANKLIN SCOTT, OF GAINESVILLE, TEXAS.

STALK-CHOPPER.

1,039,327.

Specification of Letters Patent. Patented Sept. 24, 1912.

Application filed March 16, 1912. Serial No. 684,284.

*To all whom it may concern:*

Be it known that I, OSCAR F. SCOTT, a citizen of the United States, residing at Gainesville, in the county of Cooke and State of Texas, have invented certain new and useful Improvements in Stalk-Choppers; and I do hereby declare the following to be a full, clear, and exact description of the invention, such as will enable others skilled in the art to which it appertains to make and use the same.

This invention relates to improvements in stalk choppers of the vertical type employing horizontally disposed cutters.
One object of the invention is to construct the machine in such manner that it will operate to cut stalks close to the ground and to simultaneously cut each stalk into a number of pieces.
A further object is to so construct the machine that the frame carrying the cutter shafts can be tilted forwardly or backwardly.

A further object is to provide means for raising and lowering the cutting mechanism to permit the same to be adjusted in a manner to ride over more or less elevated portions of the ground.

With these and other objects in view, the invention consists in certain novel features of construction and combinations of parts as hereinafter described and pointed out in the claims.

In the accompanying drawings, Figure 1 is a perspective view of the machine; Fig. 2 is a partial front elevation, partly in section, and Figs. 3, 4 and 5 are detail views.

1 represents an axle provided at its ends with suitable journals mounted in the hubs of carrying wheels 3, 3. A horizontally disposed frame 4, having a general U-shape, is mounted upon the axle and extends both rearwardly and forwardly therefrom,—the side members of this frame constituting guides for stalks to the cutter mechanism hereinafter described. Arms 5 project downwardly and somewhat forwardly from the axle near the respective ends thereof and with these arms the ends of a U-shaped bail 6 are pivotally and adjustably connected. Standards 7, 7, are secured at their lower ends to the cross-bar 8 of the bail 6 and to the upper ends of said standards, a cross-bar 9 is secured. The standards 7 and the cross-bars 8—9 constitute a vertical rectangular frame in which the cutting mechanism is mounted, as will now be explained. Conical bearing cups 10 are secured to the cross-bar 8 of bail 6 for the accommodation of conical journals 11 at the lower ends of two vertical shafts 12,—the body portions of said shafts being made angular in cross-section. The upper end of each shaft 12 is provided with a threaded shank 13 which passes upwardly through an opening in the top cross-bar 9 of the vertical frame. A plurality of superimposed cutting disks 14 will be secured to each shaft 12 by means of sleeves 15,—the disks being confined between adjacent ends of said sleeves and the lower end of the lower sleeve on each shaft has a bearing on the lower cutting disk, the latter resting upon a collar 16 near the lower end of the shaft. The cutting disks have toothed peripheral portions and the disks on one shaft slightly overlap those on the other shaft. Gears 17—18 are secured to the threaded shanks at the upper ends of the respective shafts 12 and are provided in their under faces with race-ways or grooves for anti-friction balls 19,—said balls having bearings in suitable bearing boxes 20, mounted upon the upper cross-bar 9 of the vertical frame. These ball bearing devices serve to sustain the major part of the weight of the vertical shafts, cutting disks, and spacing sleeves. To protect the gears 17—18, a guard 21 is secured to the upper portion of the frame.

The cross-bar 9 of the vertical frame is provided at its ends with upwardly projecting brackets 22, in which the end portions of a shaft 23 are mounted. This shaft is provided between its ends with a bevel pinion 24 which meshes with and transmits motion to a bevel pinion 25 secured to the upper end of one of the vertical cutter shafts. It is apparent that when the shaft 23 is rotated, motion will be transmitted to both of the cutter shafts to rotate the latter in reverse directions to operate the cutting disks. The sleeves 15 (or any desired number of them) are provided with lugs 26 to which fingers 27 are secured,—said fingers being thus located intermediate the pairs of cutting disks and are of sufficient length to project outwardly beyond the vertical planes of the cutting edges of said disks. From this construction it will be seen that when the machine is moved forwardly and motion transmitted to the cutting disks, the stalks will be guided or directed to the cutting disks by the side members of the horizontal frame 4 and will be engaged by the rotating fingers 26 to properly press said stalks against the cutting disks where said disks overlap.

In order to transmit motion to the shaft 23, a sprocket wheel 28 is mounted to rotate with one of the carrying wheels 3 and a sprocket chain 29 passing over this sprocket wheel, also passes over a sprocket wheel 30 secured to the shaft 23. The sprocket chain 29 is made of considerable length so as to permit vertical adjustment of the cutting mechanism (as presently explained) and in order to retain said sprocket chain normally taut a chain tightener will be employed. This tightener may conveniently consist of a pivoted arm 31 provided at its free end with a suitable wheel 32 normally pressed against the chain by the action of a spring 33 attached at one end to said pivoted arm and at the other end to the framework.

A shaft 34 is mounted in suitable bearings over the axle 1 and provided near its respective ends with bell-crank levers 35. The forward arms of these levers are connected with the upper portion of the vertical cutter frame (preferably with the cross-bar 9 thereof) by means of rods 36,—the connections of said rods with the bell-crank levers being adjustable. The upwardly projecting arms of said bell-crank levers are connected, by means of chains 37 with the U-shape bail 6, said chains passing over suitable wheels 38 mounted on the side members of the horizontal frame 4. To the shaft 34, a hand lever 39 is secured and this hand lever is provided with a suitable detent to engage a toothed segment on the framework. By operating the lever 39 in one direction lifting movement will be imparted by the chains 37 to the bail 6 and hence to the lower end of the vertical cutter frame. By the same movement of the lever 39, lifting movement will be imparted through the bell-cranks and the rods 36 to the upper end of the cutter frame. In this manner the cutter frame with the cutting mechanism can be raised to accommodate the contour of the ground over which the machine may be operated. By lengthening or shortening the distances between the bell-cranks and the upper end of the cutter frame by adjusting the connections of the rods 36, the cutter frame may be caused to rise vertically or to tilt forwardly or backwardly somewhat when it is raised and thus the angularity of the cutting mechanism with relation to the stalks to be cut can be adjusted. It is apparent that with the use of the spring pressed chain tightener before described, the vertical adjustment of the cutter frame can be readily effected.

Draft arms 40 project outwardly from the side members of the horizontal frame 4 and the free ends of said draft arms are connected by means of chains 41 with said frame 4. To the outer end of each draft arm a swingle-tree 42 is connected. In order to prevent the draft animals from being unduly threshed by the stalks as the machine moves forwardly, a guard 43 will be secured transversely across the forward ends of the side members of the horizontal frame 4. A standard 44 is secured to the rear end of the horizontal frame 4 and supports a driver's seat 45. A guard 46 is secured upon the top of the vertical cutter frame and extends over the gearing so as to prevent conflict with the latter by the driving reins. Shields 47 are secured to the side members of the horizontal frame 4 and serve to assist in directing the stalks to the cutting mechanism and to prevent the stalks engaging the draft animals.

Slight changes might be made in the details of construction of my invention without departing from the spirit thereof or limiting the scope, and hence I do not wish to restrict myself to the precise details herein set forth.

Having fully described my invention what I claim as new and desire to secure by Letters-Patent, is:

1. In a stalk chopper, the combination with a wheeled frame, and a pivoted bail, of an upright frame mounted on the pivoted bail, a plurality of pairs of cutting disks mounted in said upright frame, one pair above another, means for operating said disks, and manually operable devices mounted on the wheeled frame and connected with said pivoted bail for causing the latter to swing and raise or lower said upright frame.

2. In a stalk chopper, the combination with a wheeled frame, and a pivoted bail, of an upright frame mounted on the pivoted bail, shafts mounted in said upright frame and carrying superimposed pairs of cutters, gearing between said shafts and a wheel of the wheeled frame for operating said cutters, and manually operable devices mounted on the wheeled frame and connected with the bail for causing the latter to swing to raise or lower the upright frame and the cutters therein.

3. In a stalk chopper, the combination with a wheeled frame, of a pivoted bail, a vertical frame connected at its lower end with said bail, means for adjustably supporting the upper ends of said frame, cutting mechanism carried by the vertical frame, and hand operated devices mounted on the wheeled frame and connected with said bail for raising the vertical frame and the cutting mechanism carried thereby.

4. In a stalk chopper, the combination with a wheeled frame, of a pivoted bail, a vertical frame connected at its lower end with said bail, a shaft mounted on the horizontal frame, bell-crank levers secured to said shaft, rods adjustably connecting said bell-crank levers with the upper portion of the vertical frame, connections between said bell-crank levers and the pivoted bail, and a hand lever secured to said shaft.

5. In a stalk chopper, the combination with a wheeled frame and a vertical frame supported thereby, of bearing boxes at the lower end of said vertical frame, vertical shafts in said vertical frame and having mountings in said bearing boxes, cutters on said shafts, sleeves spacing the cutters on each shaft from each other, a bearing on each shaft for the lower sleeve, gears secured to the upper ends of said shafts above the top bar of the vertical frame, roller bearings between said gears and the top bar of the vertical frame, and gearing connected with one of the wheels of the wheeled frame for operating said gears.

In testimony whereof, I have signed this specification in the presence of two subscribing witnesses.

OSCAR FRANKLIN SCOTT.

Witnesses:
F. MORRIS, Jr.,
A. W. SMITH.